United States Patent
Koenig et al.

(10) Patent No.: US 11,465,459 B2
(45) Date of Patent: Oct. 11, 2022

(54) VEHICLE WHEEL SUSPENSION HAVING A SUSPENSION SPRING AND HAVING AN ADDITIONAL SPRING ELEMENT CONNECTABLE IN SERIES WITH SAID SUSPENSION SPRING

(71) Applicant: Bayerische Motoren Werke Aktiengesellschaft, Munich (DE)

(72) Inventors: Roland Koenig, Habach (DE); Alfred Pruckner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/048,524

(22) PCT Filed: Mar. 27, 2019

(86) PCT No.: PCT/EP2019/057779
§ 371 (c)(1),
(2) Date: Oct. 16, 2020

(87) PCT Pub. No.: WO2019/206553
PCT Pub. Date: Oct. 31, 2019

(65) Prior Publication Data
US 2021/0162828 A1 Jun. 3, 2021

(30) Foreign Application Priority Data
Apr. 27, 2018 (DE) ...................... 10 2018 206 605.1

(51) Int. Cl.
*B60G 11/62* (2006.01)
*B60G 17/016* (2006.01)

(52) U.S. Cl.
CPC .......... *B60G 11/62* (2013.01); *B60G 17/0164* (2013.01); *B60G 2202/12* (2013.01);
(Continued)

(58) Field of Classification Search
CPC .......... B60G 11/56; B60G 11/58; B60G 11/62
See application file for complete search history.

(56) References Cited

U.S. PATENT DOCUMENTS 3,598,422 A 8/1971 Strauff
3,768,793 A * 10/1973 Hampton ............. B60G 15/061
267/225
(Continued)

FOREIGN PATENT DOCUMENTS

DE 80 25 791 U1 4/1993
DE 692 15 980 T2 7/1997
(Continued)

OTHER PUBLICATIONS

International Search Report (PCT/ISA/210) issued in PCT Application No. PCT/EP2019/057779 dated Jul. 8, 2019 with English translation (eight (8) pages).
(Continued)

*Primary Examiner* — James A English
(74) *Attorney, Agent, or Firm* — Crowell & Moring LLP

(57) ABSTRACT

A vehicle wheel suspension includes a suspension spring and an additional spring element. The additional spring element is disposed in a working chamber of a hydraulic cylinder. The working chamber, in hydraulic terms, is configured to be completely shut off by a check valve and the volume thereof with an opened check valve while activating a vehicle drive apparatus with braked vehicle wheels being variable by the anti-dive angle and/or the anti-squat angle. For such a volumetric variation of the working chamber, a hydraulic medium is flowable through the opened check valve.

4 Claims, 1 Drawing Sheet

(52) U.S. Cl.
CPC ............... *B60G 2202/152* (2013.01); *B60G 2204/1244* (2013.01); *B60G 2500/22* (2013.01)

(56) References Cited

U.S. PATENT DOCUMENTS

| | | | | |
|---|---|---|---|---|
| 4,733,883 | A | * | 3/1988 | Sugasawa .......... B60G 17/0164 280/5.513 |
| 5,013,061 | A | * | 5/1991 | Fujimura ........... B60G 17/0185 280/124.159 |
| 5,222,759 | A | * | 6/1993 | Wanner .................. B60G 17/04 280/124.158 |
| 5,263,695 | A | | 11/1993 | Bianchi |
| 10,214,071 | B1 | * | 2/2019 | Dillenbeck ............ B60G 15/12 |
| 10,473,179 | B2 | * | 11/2019 | Ripa ...................... F16F 9/3488 |
| 11,001,119 | B2 | * | 5/2021 | Kokotovic ............ B60G 17/08 |
| 2016/0200162 | A1 | | 7/2016 | Luczak et al. |
| 2018/0134107 | A1 | * | 5/2018 | von Holst ............ B60G 17/056 |
| 2018/0147909 | A1 | | 5/2018 | Renn et al. |

FOREIGN PATENT DOCUMENTS

| | | |
|---|---|---|
| DE | 10 2009 047144 A1 | 5/2011 |
| DE | 10 2012 112 717 A1 | 6/2014 |
| DE | 10 2013 211 660 A1 | 12/2014 |
| DE | 10 2015 008 622 B3 | 11/2016 |
| DE | 10 2015 208 785 A1 | 11/2016 |
| DE | 102017212532 A1 * | 1/2019 ........... B60G 15/061 |
| DE | 102018202827 A1 * | 8/2019 ......... B60G 17/0416 |
| JP | 2006056499 A * | 3/2006 |
| WO | WO 2014/125404 A1 | 8/2014 |

OTHER PUBLICATIONS

German-language Written Opinion (PCT/ISA/237) issued in PCT Application No. PCT/EP2019/057779 dated Jul. 8, 2019 (six (6) pages).

German-language Search Report issued in German Application No. 10 2018 206 605.1 dated Jan. 8, 2019 with partial English translation (11 pages).

Engineering Explained, The Ford GT Suspension Is Unlike Anything Else (Animation), Youtube, Jan. 3, 2018, pp. 1-4, URL:http://www.youtube.com/watch?v=L0rAU0or3rQ XP054979484 (four (4) pages).

* cited by examiner

VEHICLE WHEEL SUSPENSION HAVING A SUSPENSION SPRING AND HAVING AN ADDITIONAL SPRING ELEMENT CONNECTABLE IN SERIES WITH SAID SUSPENSION SPRING

BACKGROUND AND SUMMARY OF THE INVENTION

The embodiments of the invention relate to a vehicle wheel suspension having a suspension spring and having an additional spring element which for varying the spring stiffness of the wheel suspension and the height setting of the vehicle superstructure above the carriageway is connectable in series with the suspension spring, the additional spring element not being configured as a fluid spring but in a material with low internal friction. In terms of the prior art, apart from documents DE 10 2015 208 785 A1 and DE 10 2009 047 144 A1, reference is also made to documents DE 10 2015 008 622 B3 and DE 10 2013 211 660 A1.

The last-mentioned document describes a method and a device for adjusting the height of the superstructure of a two-axle motor vehicle driven by a drive apparatus, the superstructure being proportionally supported on a wheel-guiding control arm of a vehicle axle by way of a suspension spring, in which the vertical spacing between the two support points of the suspension spring is variable by repositioning the location of the support point of the suspension spring that lies on the control arm which is pivotable in relation to the vehicle superstructure.

An actuatable locking unit for the repositionable suspension spring support point is provided herein, by way of which actuatable locking unit this repositionable suspension spring support point is able to be fixed or released in relation to the control arm, this being actuated by an electronic control unit, and the electronic control unit in the case of a released locking unit is furthermore provided for allowing a drive torque to act on the vehicle by way of the drive apparatus, the vehicle being at least partially braked by means of the vehicle brake system, the anti-squat angle and/or anti-dive angle of the vehicle causing between this axle and the vehicle superstructure a vertical relative movement which effects or causes a repositioning of the repositionable suspension spring support point. An adjustment of the height of the vehicle superstructure can thus be performed without an actuator which is demanding in terms of power, such as is required in a system according to the two documents first mentioned at the outset, for example. DE 10 2015 008 622 B3, the third-mentioned document at the outset, also utilizes the height-adjustment principle of DE 10 2013 211 660 A1 (having the anti-dive angle) but for filling the suspension spring configured as an air spring furthermore requires a compressed-air reservoir and thus, apart from the energy of the vehicle drive apparatus, additional energy for varying the height setting of the vehicle.

An inventive vehicle wheel suspension, in which the energy of the drive apparatus is sufficient for adjusting the height of the vehicle superstructure without a relatively complex repositioning of the suspension spring support point having to be implemented is disclosed in this application.

In the inventive vehicle wheel suspension the additional spring element is disposed in a working chamber of a hydraulic cylinder, this working chamber in hydraulic terms being able to be completely shut off by means of a check valve and the volume thereof with an opened check valve while activating a vehicle drive apparatus with braked vehicle wheels being variable by the anti-dive angle and/or the anti-squat angle, and wherein, for such a volumetric variation of the working chamber, hydraulic medium can flow through the opened check valve. Advantageous embodiments and refinements are also disclosed in this application.

According to the embodiments of the invention, apart from an additional spring element, a hydraulic support cylinder (presently referred to as only the hydraulic cylinder) is provided for supporting the additional spring element, wherein the additional spring element is clamped in a working chamber of the support cylinder. Depending on whether the volume of the hydraulic working chamber is or is not variable by an activatable or de-activatable exchange of hydraulic medium by way of a so-called hydraulic compensation chamber, the additional spring element can be switched in an active or passive manner. The vehicle superstructure preferably sits higher above the carriageway when the working chamber of the support cylinder or hydraulic cylinder is enlarged than when the working chamber is reduced in size. In the latter case the additional spring element is deactivated such that only the suspension spring acts when the height setting of the vehicle is less. As opposed thereto, in the case of an increased height setting of the vehicle and an enlarged working chamber of the support cylinder or hydraulic cylinder, in addition to the suspension spring, the additional spring element which is functionally connected in series with the latter then becomes effective such that the overall spring rate of the suspension spring and the additional spring element, and thus the spring stiffness of the wheel suspension, in this instance is less than with an exclusively effective suspension spring. A lowered running gear with a harder suspension is thus advantageously implementable (in particular in a double-track vehicle or a passenger motor car), while a softer, comfort-oriented, suspension is implemented at a larger height setting of the vehicle. It is to be explicitly pointed out that this hydraulic cylinder (or support cylinder) provided according to the invention does not act, or cannot act, as a vibration damper because either an exchange of hydraulic medium between the working chamber and a compensation chamber is prevented or, in the case of an enabled exchange of hydraulic medium, this exchange can take place in a substantially or almost non-curtailed manner. In the interpretation of the afore-mentioned terms "substantially" or "almost" herein, the relative minor lifting rate between the vehicle superstructure and the vehicle wheel have to be taken into account. Also, the aforementioned hydraulic medium is indeed substantially, but really just only substantially, incompressible.

Other objects, advantages and novel features of the present invention will become apparent from the following detailed description of one or more preferred embodiments when considered in conjunction with the accompanying drawings, in which:

DETAILED DESCRIPTION OF THE DRAWINGS

Figure 1:
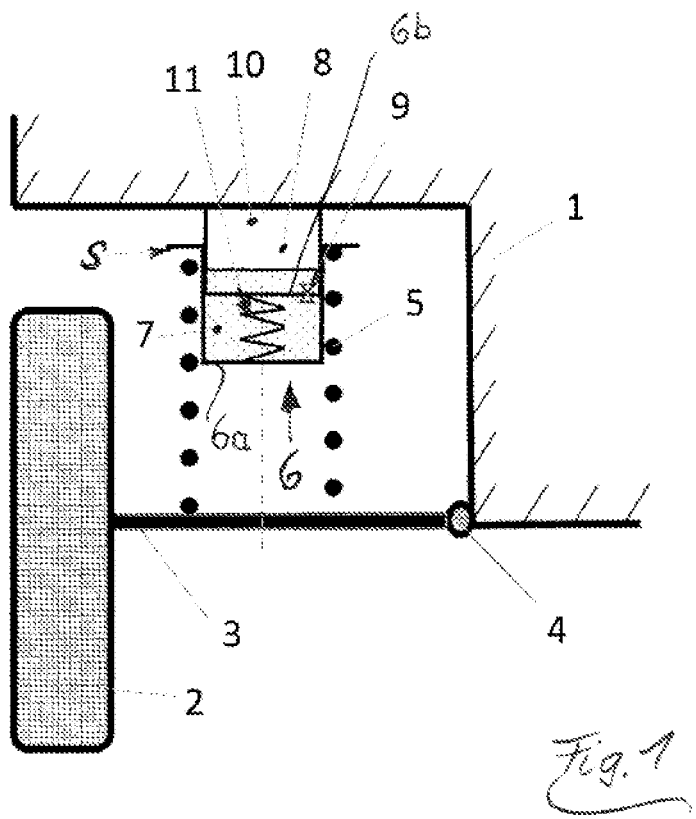
FIG. 1 shows the conditions at a comparatively large height setting of the vehicle.
Figure 2:
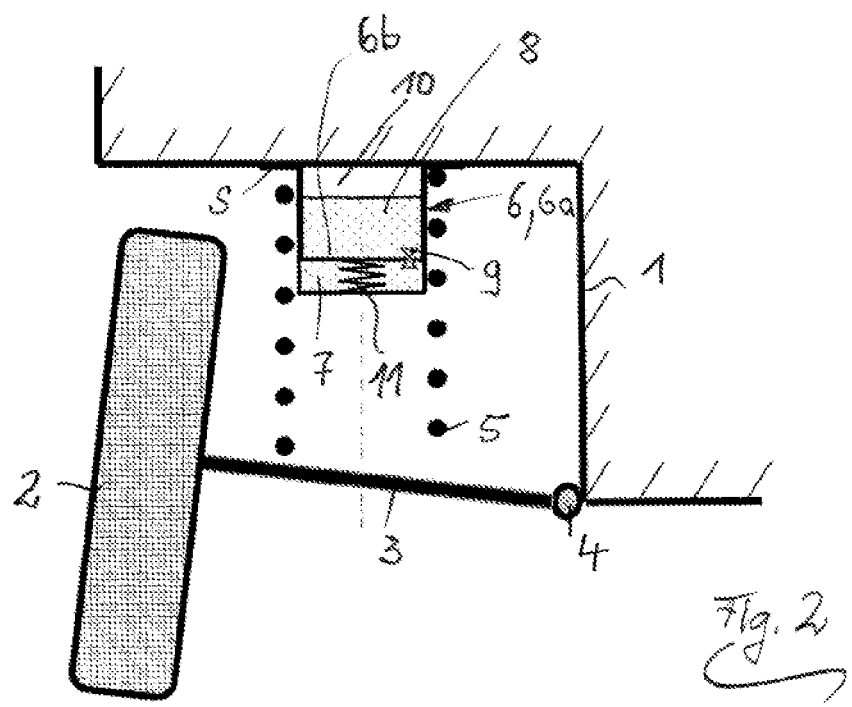
FIG. 2 shows the conditions at a comparatively lowered state.

Further features and advantages are derived from the description hereunder of an exemplary embodiment which is illustrated only in a schematic drawing, wherein FIG. 1 shows the conditions at a comparatively large height setting of the vehicle while the lowered state is illustrated in FIG. 2. A view from the rear (when viewed in the travel direction of the vehicle) onto the left rear wheel of a motor vehicle, for example a passenger motor vehicle, is shown in each case here.

The superstructure of the vehicle, which is illustrated only in fragments, is identified by the reference sign 1 and is proportionally supported on the left rear wheel 2 shown of the vehicle, specifically—as is fundamentally typical—by way of a suspension spring 5 which is configured as a helical spring and is supported on a wheel-guiding control arm 3, on the one hand, the latter (as is typical) being mounted or supported, respectively, in a joint 4 on the vehicle superstructure. However, the suspension spring 5, by way of the end thereof that faces away from the control arm 3, (deviating from the typical prior art) is supported on a hollow cylinder 6a of a hydraulic cylinder 6 within which a support piston 6b is provided or supported, respectively. The support piston 6b of the hydraulic cylinder 6 is presently supported or fastened directly on the vehicle superstructure 1 such that the hollow cylinder 6a of the hydraulic cylinder 6 is repositionable in relation to the support piston 6b and thus in relation to the vehicle superstructure 1, specifically substantially in the vertical direction (perpendicular to the carriageway on which the vehicle is standing) and thus in the direction of action of the suspension spring 5.

A working chamber 7 is formed within the hollow cylinder 6a of the hydraulic cylinder 6 so as to be between the base of the hollow cylinder 6a and the end side of the support piston 6b that faces away from the vehicle superstructure 1. This working chamber 7 is filled with a hydraulic medium, and an additional spring element 11 is clamped in this working chamber 7 so as to be between the end side of the support piston 6b and the base of the hollow cylinder 6a that faces this end side. This additional spring element 11, just like presently the suspension spring 5, is not configured as a fluid spring (or gas spring) but as a helical spring, or as termed in the International Patent Classification, in a material with low internal friction.

The support piston 6b of the hydraulic cylinder 6, which may also be referred to as a hydraulic support cylinder, is at least in part configured so as to be hollow, and a check valve 9 which can release or block a connection between the working chamber 7 and the hollow interior space 8 of the support piston 6b is provided in the end side of the support piston 6b that faces the working chamber 7, or in this end wall, respectively (the connection not being illustrated in the drawing and penetrating said end wall). A certain quantity of hydraulic medium herein is also situated in the hollow interior space 8 of the support piston 6b (as in the working chamber 7), but the interior space 8 is not completely filled with hydraulic medium, rather this hydraulic medium in the interior space 8 is slightly pressurized by a gas volume 10 which is provided between the surface level of the hydraulic medium in the interior space 8 (illustrated by dots in the figure) and the floor of the vehicle superstructure 1 (in the simplified schematic drawing here). It is to be explicitly stated that this gas volume 10 does not have any direct or significant effect on the functioning of the assembly according to the invention as explained hereunder, but significantly serves for preventing foaming or extreme sloshing or the like of the hydraulic medium in the interior space 8, which is also referred to as the hydraulic compensation chamber 8. While, as can be seen, the additional spring element 11 and the gas spring formed by the gas volume 10, for which gas spring the reference sign 10 is likewise used, are indeed connected in parallel with one another, that is to say that said the additional spring element 11 and the gas spring 10 act by way of the same spring travel, the latter can ultimately be neglected in terms of the effect thereof because the additional spring element 11 possesses a substantially larger spring stiffness than the gas spring 10.

When the check valve 9 in the end side of the support piston 6b is opened, it is thus possible for hydraulic medium to pass from the working chamber 7 into the hydraulic compensation chamber 8 and vice versa. Repositioning of the hollow cylinder 6a of the hydraulic cylinder 6 in relation to the support piston 6b of the latter is thus possible. The additional spring element 11 which is provided in the hydraulic cylinder 6 is thus connected in series with the suspension spring 5 which in the hollow cylinder is supported on a web S of the latter, that is to say that the suspension spring 5 and the additional spring element 11 act successively, wherein the spring forces in these two spring elements (suspension spring 5 and additional spring element 11) are equal in this instance. The sum of the spring stiffness of these two spring elements connected in series is derived from the reciprocals of the sums of the individual reciprocals of the spring stiffnesses. The sum of the stiffness of said two spring elements (suspension spring 5 and additional spring element 11) is thus at all times less than either of the two spring stiffnesses of these two spring elements and is in particular less than that of the suspension spring 5 alone.

When the check valve 9 is closed, no exchange of hydraulic medium between the working chamber 7 and the hydraulic compensation chamber 8 interior space 8 of the support piston 6c) can thus take place such that the hollow cylinder 6a cannot perform any notable (relative) movement in relation to the support piston 6b. If at all, very minor relative movements in the context of the compressibility of the hydraulic medium in terms of "elastic compression" are possible, while a minor negative pressure can form in the working chamber 7 during elastic decompression, that is to say in a movement of the vehicle superstructure 1 away from the wheel 2. The maximal forces acting in such an elastic decompression movement are typically lower than when elastically compressing, wherein such a negative pressure will also only arise very briefly. It can therefore be said that the additional spring element 11 remains practically ineffective with a closed check valve 9 such that the suspension spring 5 alone implements the spring stiffness of the respective vehicle axle in this instance.

Switching between an opened check valve 9 and a closed check valve 9 thus enables two different spring stiffnesses to be implemented, specifically with the sole effect of the suspension spring 5, or with the effect of the additional spring element 11 being connected in series with the suspension spring 5. For this purpose, the height setting of the vehicle, that is to say the vertical spacing of the vehicle superstructure 1 from the carriageway, can easily be advantageously set in a suitable manner, as will be explained hereunder.

For example, if the vehicle is braked on the rear axle and a drive torque directed in the typical travel direction (i.e. toward the front) is simultaneously applied to the wheels by way of the drive unit, the anti-dive angle causes a compression of the springs of the vehicle in particular when the vehicle comes to a standstill. The basic design of the system described herein can be chosen in such a manner, or the hydraulic cylinder 6 and the suspension spring 5 in the exemplary embodiment are dimensioned and disposed in such a manner, respectively, that the suspension spring 5 at a minimal volume of the working chamber 7 of the hydraulic cylinder 6, while functionally by-passing the additional spring element 11, is supported directly or quasi-directly on the vehicle superstructure. This state is illustrated in FIG. 2. In that the web S of the hollow cylinder 6a, on which web S the suspension spring 5 is supported, is provided on the end side of the hollow cylinder 6a that faces the vehicle superstructure 1, this web S by way of the side thereof that faces away from the suspension spring 5, while utilizing the anti-dive angle (cf. above), with an opened check valve 9 can be brought to bear on the underbody of the vehicle superstructure 1. When the check valve 9 is closed upon reaching this state, the vehicle superstructure 1 thus maintains this lowered position even when the drive torque is withdrawn, that is to say when an anti-dive angle is no longer present. And since the additional spring element 11 does not become effective with a closed check valve 9, an increased spring stiffness by virtue of the now solely acting suspension spring 5 is simultaneously represented in this lowered position which typically represents a sport state. When the check valve 9 is then opened at a later point in time, this like the closing of the check valve 9 being able to be initiated by the driver of the vehicle or by an electronic control unit and implemented by a suitable actuator, the hollow cylinder 6a of the hydraulic cylinder 6 (conjointly with the web S), under the (now possible) effect of the additional spring element 11, is thus displaced toward the carriageway such that the state according to FIG. 1 results. A comfortable, large height setting of the vehicle is illustrated here, having an advantageously more comfortable, since softer, spring stiffness (of the overall system, that is to say of the suspension spring 5 and the additional spring element 11). Switching of the spring rate in combination with a lowering of the vehicle superstructure while utilizing the vehicle drive unit and the brakes of the vehicle is thus provided by the present system.

What is claimed is:

1. A vehicle wheel suspension comprising:
   a suspension spring;
   an additional spring element, which is configured to vary spring stiffness of the wheel suspension and height setting of a vehicle superstructure above a carriageway by being connectable in series with the suspension spring, the additional spring element not being configured as a fluid spring but in a material with low internal friction, wherein
   the additional spring element is disposed in a working chamber of a hydraulic cylinder, the working chamber, in hydraulic terms, being configured to be completely shut off by a check valve and the volume thereof by opening the check valve while activating a vehicle drive apparatus with braked vehicle wheels being variable by an anti-dive angle and/or an anti-squat angle, and
   for such a volumetric variation of the working chamber, a hydraulic medium is flowable through the opened check valve.

2. The vehicle wheel suspension according to claim 1, further comprising: a support piston of the hydraulic cylinder that is supported on the vehicle superstructure, and the suspension spring is supported on a hollow cylinder of the hydraulic cylinder, the hollow cylinder guiding the support piston.

3. The vehicle wheel suspension according to claim 2, wherein the hydraulic cylinder and the suspension spring are dimensioned and disposed in such a manner that the suspension spring at a minimal working chamber volume of the hydraulic cylinder, while functionally by-passing the additional spring element, is supported quasi-directly on the vehicle superstructure.

4. The vehicle wheel suspension according to claim 3, further comprising: a hydraulic compensation chamber that is provided in the hydraulic cylinder on a side of the check valve that lies opposite the working chamber, the hydraulic compensation chamber containing a gas cushion which acts on the hydraulic medium.

* * * * *